(No Model.)  2 Sheets—Sheet 1.

J. AITCHISON.
OPERA OR LIKE GLASSES.

No. 583,835.  Patented June 1, 1897.

Witnesses  Inventor

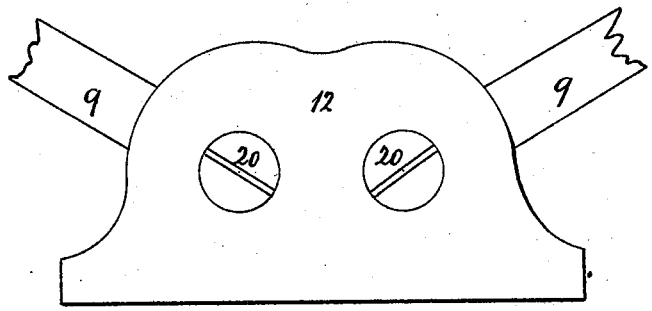
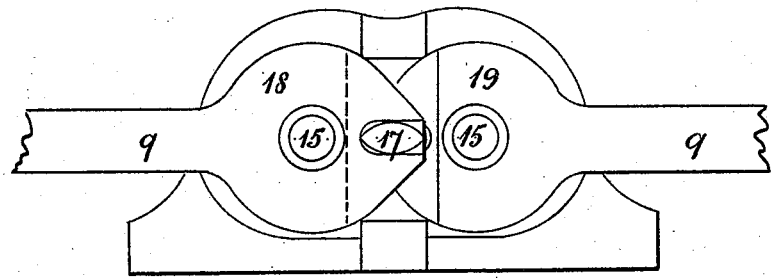
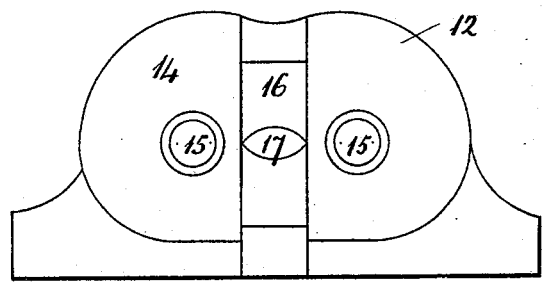

UNITED STATES PATENT OFFICE.

JAMES AITCHISON, OF LONDON, ENGLAND.

OPERA OR LIKE GLASS.

SPECIFICATION forming part of Letters Patent No. 583,835, dated June 1, 1897.

Application filed January 26, 1897. Serial No. 620,797. (No model.) Patented in England November 6, 1896, No. 24,883.

*To all whom it may concern:*

Be it known that I, JAMES AITCHISON, optician, a subject of the Queen of Great Britain, residing at 14 Fleet Street, London, E. C., England, have invented new and useful Improvements in Opera or Like Glasses, (for which I have obtained a patent in Great Britain, No. 24,883, dated November 6, 1896,) of which the following is a specification.

This invention relates to opera and similar glasses, and has for its object to provide new and improved means whereby the lenses are caused to move in unison in opening and closing the glasses. This object is accomplished in the manner and by the means hereinafter described and claimed, reference being made to the accompanying drawings, in which—

Figure 1:
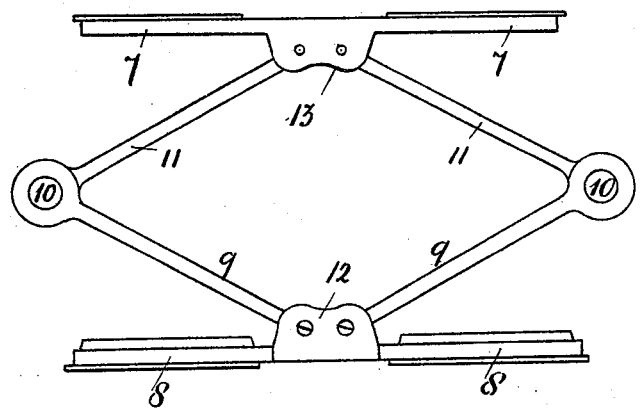
Figure 2:
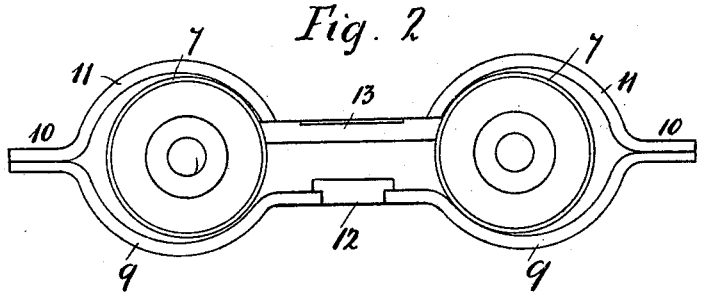
Figure 3:
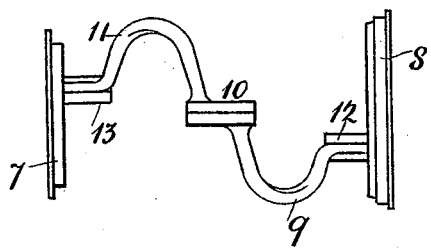

Figure 1 is an elevation of my improved opera-glass, showing the frames placed some distance apart. Fig. 2 is a plan view of the glass in a closed position. Fig. 3 is an end view showing the frames apart, as in Fig. 1. Fig. 4 is an enlarged plan view of one of the parallel-motion gear-cases. Fig. 5 is a similar view, the cover being removed to show the gear. Fig. 6 is a similar view of the lower plate and toothed slide.

7 is the frame fitted with the eye-lenses, and 8 is the frame fitted with the object-glasses.

9 9 are two arms pivoted at 10 10 to two other arms 11 11, so as to move freely in the ring-pivots 10 10. The arms 9 and 11 are bent, as shown in Figs. 2 and 3, so as to be clear of the focus and line of sight. The ends of the arms 9 and 11 where they enter the gear-cases 12 and 13 are integral with slotted disks engaging with a vertical tooth attached to a sliding plate, as shown in Figs. 5 and 6. The gear-cases being similar it will be sufficient to describe the case 12. The lower plate 14 of the case 12 carries two cylindrical studs 15 15, which are bored and screw-threaded to receive the screws 20 20. The plate 14 is grooved to receive the sliding plate 16, and this sliding plate carries a vertical stud or tooth 17. The ends of the levers or arms 9 9 are formed with forked disks 18 19, as shown in Fig. 5, the forked disks being pivoted upon the studs 15 and formed so as to simultaneously engage the tooth 17, whereby simultaneity of motion and angularity is secured to the arms. 20 20 are screws which pass through the top cover-plate of the gear-case and enter the studs 15, thus securing the gear and enabling the opera-glass to be opened and closed as required.

Having thus described my invention, what I claim is—

In an opera, or similar glass, the combination of swinging arms having forked pivoted disks, and a sliding plate having a stud, or tooth, engaging the forked parts of the disks, substantially as and for the purposes described.

Dated this 22d day of December, 1896.

JAMES AITCHISON.

Witnesses:
 GEORGE C. DOWNING,
 FRED C. HARRIS.